UNITED STATES PATENT OFFICE.

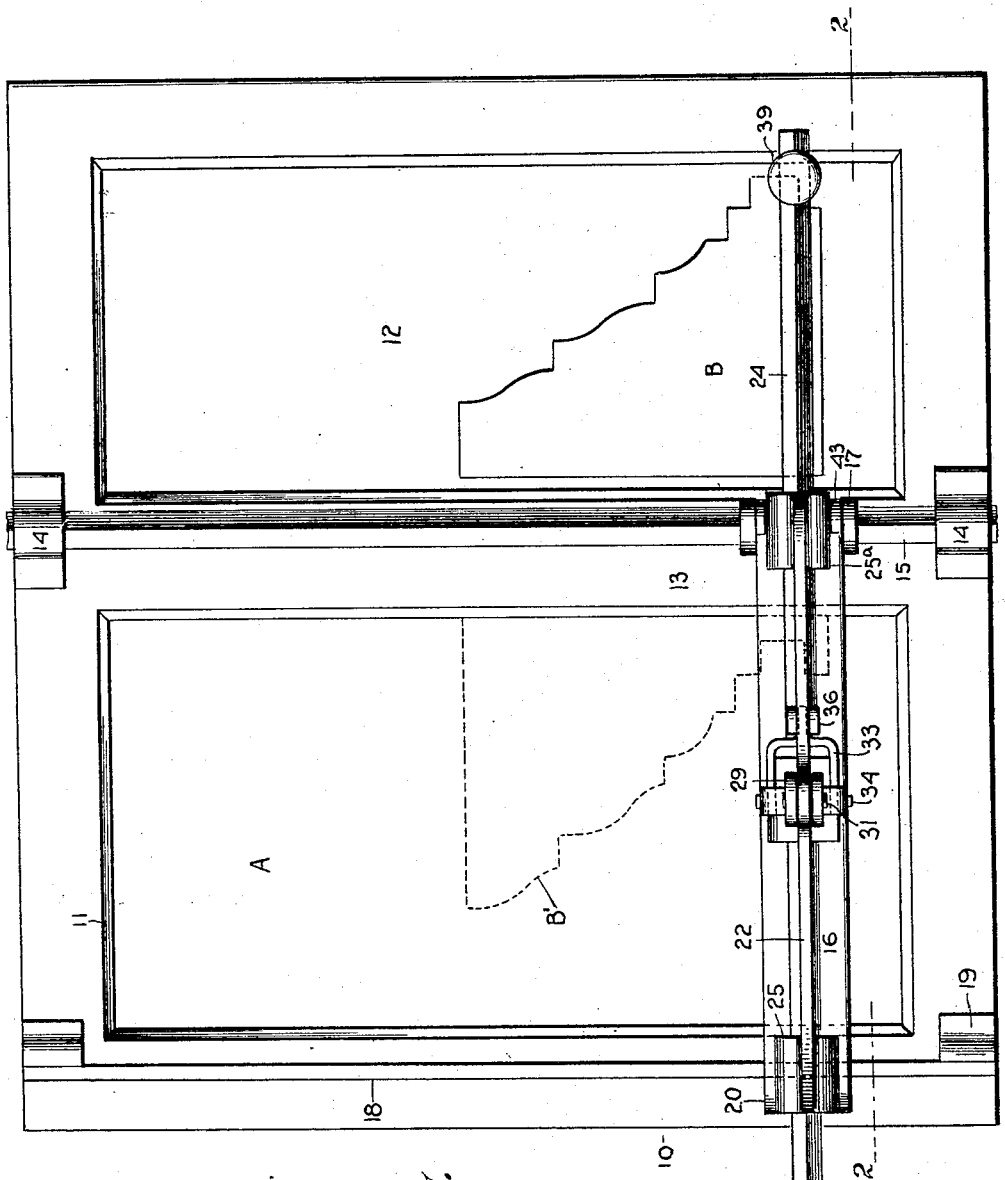

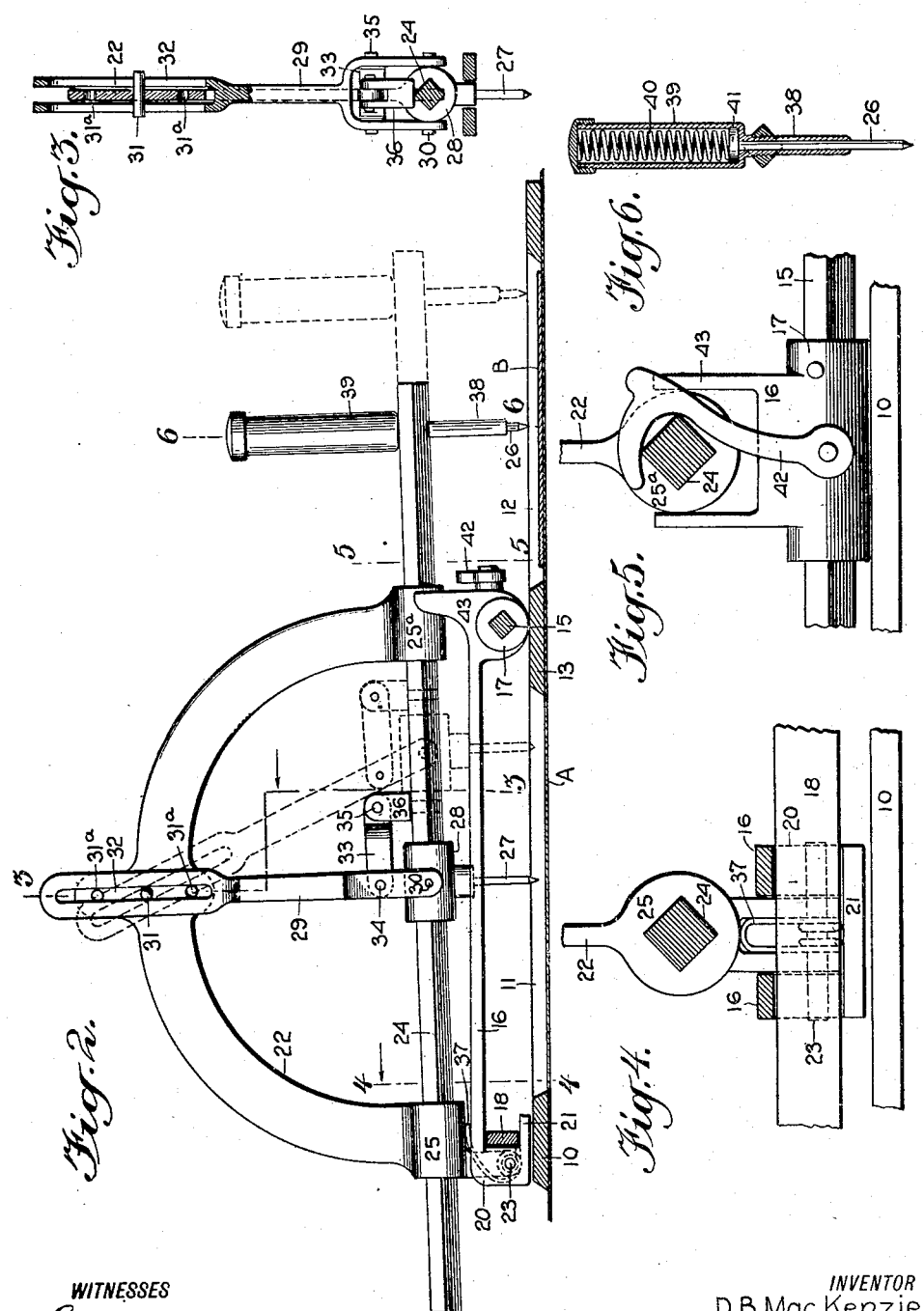

DAVID B. MacKENZIE, OF MUSCATINE, IOWA.

INSTRUMENT TO MARK PATTERNS FOR MOLDING-CUTTERS.

1,199,585.      Specification of Letters Patent.      Patented Sept. 26, 1916.

Application filed December 31, 1915. Serial No. 69,626.

*To all whom it may concern:*

Be it known that I, DAVID B. MACKENZIE, a citizen of the United States, and a resident of Muscatine, in the county of Muscatine and State of Iowa, have invented a new and Improved Instrument to Mark Patterns for Molding-Cutters, of which the following is a full, clear, and exact description.

My invention relates to a device for finding the exact shape of cutters to form any given design or pattern of molding made on woodworking or similar machines.

It is well understood among wood workers that the cutters used in making molded surfaces must be elongated or projected from the original pattern in one direction only, retaining the same width as the pattern. The elongation represents the allowance necessary for the swing of the cutter head, that is to say, the angle at which the cutter is set on the head relatively to the cutting circle. The extent of the elongation is determined by the depth of the cut, gradually increasing at a certain ratio from the surface of the mold or zero depth to about three-eighths of an inch in a cut two inches deep and varying according to the size of the cutting circle.

The exact shape of the cutters may be determined by a certain geometrical formula which is not well understood by the average workmen and is a rather slow and tedious process. In general practice, the shape of the cutter is usually found by guess work and repeated trials consuming much time in the operation.

The prime object of my invention is to provide an effective and convenient mechanical means for simply and correctly obtaining the exact shape of any cutter to form a given molding merely by tracing the outline or profile of the molding wanted.

The stated object of the invention is attained by the instrument hereinafter particularly described.

Reference is to be had to the accompanying drawings forming a part of this specification in which similar reference characters indicate corresponding parts in all the views.

Figure 1 is a plan view of an instrument embodying my invention; Fig. 2 is a vertical section on the line 2—2, Fig. 1; Fig. 3 is a vertical section on the line 3—3, Fig. 2; Fig. 4 is a transverse vertical section on the line 4—4, Fig. 2, on an enlarged scale; Fig. 5 is a detail vertical section on the line 5—5, Fig. 2, and on the scale of Fig. 4; and Fig. 6 is a fragmentary vertical section on the line 6—6, Fig. 2.

In constructing a practical embodiment of my invention in accordance with the illustrated example, a base frame 10 is provided, mounting the several movable elements hereinafter described. The frame is adapted to be placed on a table or the like, over paper A, on which the lines of the pattern are to be produced, the frame having an opening 11 through which the paper is presented. Similarly an opening 12, or depression, is provided in the frame 10 to receive the pattern B of the molding to be produced. Thus, the base 10, in practice, consists of an open rectangular frame having a central member 13 near the center extending between and connecting the opposite sides of the frame.

On the frame 10 adjacent to the center bar 13 at opposite sides are guides or bearings 14 in which a slide rod 15 has guided movement. Upon the rod 15 is secured a frame 16 disposed transversely to the direction of said rod. The hub 17 of the frame 16 is secured to the rod 15 in any suitable manner and at its opposite end the said frame has sliding movement on a fixed guide bar 18 which is rigid with the adjacent side of the frame 10, being secured to the latter by blocks 19, or other suitable means. The end of the frame 16, adjacent to the bar 18, has a depending member 20 integral therewith at the outside of the said bar 18, and an inwardly projecting member 21, which extends beneath the said bar whereby to give a proper guided movement to the frame 16, and afford firm support for the said frame.

An arched frame 22 is carried by the frame 16 and is pivotally connected at one end thereto as at 23 so that the said frame may have a slight rocking movement vertically, that is to say, in its own vertical plane. A slide rod 24 is disposed transversely to the rod 15, and has guided movement in bearings or guides, 25, 25ª, on the frame 22. Thus, the slides, 15, 24, may be slid axially at right angles to each other, the arrangement being such that the movement of the first slide rod 15 will carry the frames, 16, 22, and the second slide rod 24. At the same time the said slide rod 24 may be moved in the direction of its axis independently of and transversely to the slide rod 15.

A vertical pointer or tracer 26 is carried by the slide bar 24 at one end to trace the profile of the pattern B. A marker 27 is provided on the said slide bar in the form of a stylus or a perforator to be given a movement relatively to the tracer 26 as follows: The stylus or the perforator 27 may be formed of a pencil or a pricking device carried by a sleeve 28 which is loose on the rod 24. A lever 29 is pivoted at its forked lower end as at 30 to the sleeve 28 and at its upper end said lever has rockable and slidable connection with the arched frame 22, there being a pin 31 on the said frame extending through slots 32 in the forked upper end of the said lever. Connection between the lever 29 and the slide 24 is effected by a link 33, one end of which is pivoted as at 34 to said lever and the other end is pivoted as at 35 to a stud 36 on the said slide rod 24.

In the use of the device the paper A having been placed beneath the frame 10 and the pattern B having been secured in position parallel with the inner side edges of the frame by means of thumb tacks or other expedient, the profile of the pattern B is traced by the tracer 26. In the movements of the tracer 26, the slide rods 15 and 24 will respond. As the slide 24 is moved lengthwise there will be an elongation of the movement of the tracer 26 in one direction but not in the other, that is to say, an elongation only in the direction of the axis of the slide 24, the result being that the perforator or other marker 27 will describe on the paper A as indicated at B', Fig. 1, the necessary modification of the pattern B to correctly represent the pattern of the cutter required to produce a molding corresponding with the pattern B. The elongation referred to results, because, the extent of the sliding movement of the bar 24 as the tracer 26 is moved, measures the movement of the fulcrum 34 of lever 29, but the movement of the pivot 30 and sleeve 28 is according to the relative lengths of the lever arms at the opposite sides of the fulcrum; that is to say, the pin 31 or 31ª causes the lever to rock on its fulcrum 34 when said fulcrum is shifted by and with the lengthwise sliding of the bar 24, and the rocking of the lever on its fulcrum gives an accelerated movement to the sleeve 28 proportionate to the length of the longer arm of the lever 29, thereby elongating the movement of the tracer 26. The position of the pin 31 is variable, there being a vertical series of pin holes 31ª in the frame 22 to receive said pin so that by shifting the pin above or below the central position, the lines of the pattern for a smaller or larger cutter head will be produced on the paper A.

A spring 37 is provided at the pivot 23 beneath the adjacent end of the arched frame 22, whereby to slightly tilt the said frame and the slide bar 24 and thus tend to maintain bar 24 raised and the marker 27 above the surface of the paper A. The tracer 26 is yieldingly sustained on the bar 24, the shank of the said tracer passing through a vertical sleeve 38 into a cylinder 39 in which a spring 40 is housed. The lower end of the spring bears against the head 41 on the tracer 26.

In order to limit the vertical movement of the frame 22 and bar 24 by the spring 37, I provide a pivoted hook 42 on the frame 16 to engage over the slide bar 24. The hook 42 prevents disengagement of the pivoted frame 22 from the frame 16 carrying the same. It will be observed that the bearing or guide member 25ª, for the slide rod 24 at the free end of the frame 22, is received in a fork 43 on the frame 16, the said fork permitting the necessary vertical movements of the frame 22 relatively to the frame 16 but acting to brace said frame 22 against a movement other than a vertical pivotal movement. The pointer 26 should not be raised from the pattern B until the hook 42 is released. The purpose of spring 40 is to keep the tracer 26 lightly resting on the pattern B while the marker 27 is held clear of the paper by means of the spring 37. Normally the tracer 26 will rest on the pattern while the marker 27 is held raised clear of the paper until depressed by means of the cylinder 39 when the pattern is being traced, said cylinder constituting a handle.

Having thus described my invention I claim as new, and desire to secure by Letters Patent:

1. An instrument to mark patterns for molding cutters, including a frame, a bar slidable on said frame, a tracer carried by said bar, a base on which the said frame is slidable transversely to the axis of the bar, a marker slidably mounted on the said slide bar, a lever connected with the said marker and with the said frame, and a link connection between the said lever and the slide bar.

2. An instrument to mark patterns for molding cutters, including a base frame adapted to be placed on a table or the like and adapted to hold a sheet on which the pattern is to be marked, a bar slidable in the direction of its axis on the said frame, a second frame secured at one end to said slide bar and slidable at its opposite end on said base frame, an upright frame carried by the second frame, and pivoted at one end thereto, a second bar disposed on the upright frame transversely to the first bar and slidable in the direction of its axis on said upright frame, a tracer carried by the second slide bar a marker on the second slide bar, and means causing an additional displacement of the marker on the said second slide bar by a predetermined movement of said bar and tracer.

3. An instrument to mark patterns for molding cutters, including a base frame adapted to hold a sheet on which a pattern is to be marked and to hold the pattern of the molding to be produced, a second frame sildable on the first frame, a third frame pivoted at one end on the second frame, spring means to tilt the third frame on its pivot, a slide bar on the third frame disposed transversely to the direction of movement of the second frame and slidable in the direction of its axis, a tracer carried by the said slide bar, a marker slidable on the slide bar, and means causing an additional displacement of the marker for a predetermined displacement of the tracer and slide bar in the direction of the axis of the latter.

4. In an instrument to mark patterns for molding cutters, a base frame adapted to hold a pattern of the molding to be cut and to hold a sheet on which the pattern of the cutter is to be marked, a bar slidable in the direction of its axis, supporting means on which said slide bar is movable transversely to its axis, a tracer carried by the said slide bar, a marker slidable on the slide bar in the direction of the axis thereof, a lever pivoted to the said marker, a member on which the lever is pivoted at its opposite end, and a link connection between the slide bar and the said lever.

5. In an instrument to mark patterns for molding cutters, a base frame adapted to hold a pattern of the molding to be cut and to hold a sheet on which the pattern of the cutter is to be marked, a bar, a second frame on which said bar is slidable in the direction of its axis, said second frame being movable with said slide bar on the base frame in a direction transverse to the axis of the said bar, a tracer carried by the said slide bar, a marker slidable on the said bar in the direction of the axis thereof, a lever pivoted at one end to the marker, means adjustably connecting the opposite end of the lever with the said second frame to vary the leverage of the lever, and a link connection between the said lever and the slide bar.

In testimony whereof I have signed my name to this specification in the presence of two subscribing witnesses.

DAVID B. MacKENZIE.

Witnesses:
N. L. REIDLING,
ARTHUR HOFFMAN.

Copies of this patent may be obtained for five cents each, by addressing the "Commissioner of Patents, Washington, D. C."